(12) United States Patent
Ketonen

(10) Patent No.: US 8,654,660 B2
(45) Date of Patent: Feb. 18, 2014

(54) END-TO-END SERVICE QUALITY MONITORING METHOD AND SYSTEM IN A RADIO NETWORK

(75) Inventor: Veli-Pekka Ketonen, Itasalmi (FI)

(73) Assignee: 7Signal OY, Helsinki (FI)

( * ) Notice: Subject to any disclaimer, the term of this patent is extended or adjusted under 35 U.S.C. 154(b) by 586 days.

(21) Appl. No.: 12/673,222

(22) PCT Filed: Aug. 8, 2008

(86) PCT No.: PCT/FI2008/050453
§ 371 (c)(1), (2), (4) Date: May 4, 2010

(87) PCT Pub. No.: WO2009/022054
PCT Pub. Date: Feb. 19, 2009

(65) Prior Publication Data
US 2011/0096678 A1    Apr. 28, 2011

(30) Foreign Application Priority Data

Aug. 10, 2007    (FI) ..................................... 20070604

(51) Int. Cl.
*H04L 12/26*    (2006.01)

(52) U.S. Cl.
USPC ............ 370/252; 370/338; 455/423; 455/515

(58) Field of Classification Search
USPC ................. 370/252, 338; 455/423, 438, 517; 709/203, 223; 702/186
See application file for complete search history.

(56) References Cited

U.S. PATENT DOCUMENTS

| | | | | |
|---|---|---|---|---|
| 5,189,734 A * | 2/1993 | Bailey et al. | ................... | 455/438 |
| 5,818,832 A | 10/1998 | McCallister | | |
| 2002/0147007 A1* | 10/2002 | Hall et al. | ..................... | 455/423 |
| 2003/0055604 A1* | 3/2003 | Skidmore et al. | ............. | 702/186 |
| 2003/0135762 A1 | 7/2003 | Macaulay | | |
| 2003/0224797 A1 | 12/2003 | Kuan et al. | | |
| 2004/0017793 A1* | 1/2004 | Thermond et al. | ............ | 370/338 |
| 2005/0030929 A1* | 2/2005 | Swier et al. | ................... | 370/338 |
| 2005/0265296 A1 | 12/2005 | Zhang et al. | | |

(Continued)

FOREIGN PATENT DOCUMENTS

| | | |
|---|---|---|
| EP | 1 187 367 | 3/2002 |
| FI | 118713 | 2/2008 |

OTHER PUBLICATIONS

International Search Report dated Nov. 5, 2008, from corresponding PCT application.

(Continued)

*Primary Examiner* — Michael Thier
*Assistant Examiner* — Vincelas Louis
(74) *Attorney, Agent, or Firm* — MacMillan, Sobanski & Todd, LLC

(57) ABSTRACT

A method and a system for service quality monitoring in a network includes radio interfaces. The measurements are end-to-end measurements between the end user and chosen network element. The measurements are implemented using monitoring stations which can monitor the traffic passively or actively by transmitting test signals. The antenna beam directions of the monitoring stations can be controlled. The performance server works as a counterpart of the active tests. A reporting suite may define the performed measurements and it also collects the measurement data from different monitoring stations. Monitoring data from several corporate intranets can also be collected to an external server through internet connection.

34 Claims, 7 Drawing Sheets

(56) References Cited

U.S. PATENT DOCUMENTS

2006/0172711 A1 8/2006 King et al.
2007/0026854 A1 2/2007 Nath et al.
2008/0020792 A1* 1/2008 Falk et al. .................... 455/517

OTHER PUBLICATIONS

Finnish Search Report dated Apr. 25, 2008, from corresponding Finnish application.

* cited by examiner

END-TO-END SERVICE QUALITY MONITORING METHOD AND SYSTEM IN A RADIO NETWORK

BACKGROUND OF THE INVENTION

1. Field of the Invention

The present invention relates to continuous monitoring and quality parameter measurements in wireless broadband networks.

2. Description of the Related Art

In a wireless networks it is important to ensure good quality for the data traffic in the network. Quality can be verified and efficiently maintained by monitoring the functionalities of the wireless network with appropriate apparatus and procedures. The monitoring of the network reveals whether desired connection or services are available or whether a sufficient quality level for the connection is reached. Furthermore, monitoring is used for revealing any security attacks performed by a third party on a radio signal interface or through other interfaces.

New applications which often are provided by e.g. WLAN networks, WiMAX technologies and in Flash-OFDM technologies, require larger capacity and better quality than earlier. One such application is 'Voice over IP (VoIP) over WiFi (wireless fidelity)' which is also called VoFi. Other demanding applications include video streaming, video conferences (e.g. Netmeeting) and a so-called triple play functionality which means video, voice call and file transfer simultaneously over packet data network.

Wireless networks also regularly suffer from technology related issues significantly impacting to end user experience. Certain models or versions of wireless network equipment and user equipment may be incompatible. Amount of combinations is so high that testing everything against each others is impossible task for equipment manufacturers. These types of issues cause regularly problems with users accessing and using wireless services. Another typical phenomenon in wireless networks is "sleeping cell" syndrome. This means that cell may be visible to end users, but cannot provide any traffic or service. This may be related to a fault in the equipment, where each software version may behave differently in this sense. True end user experience depends on the full end-to-end functionality of the network, including wireless connection and all related wired infrastructure towards desired other network users or server offering services to the end user. The monitoring of the radio interface only is not sufficient. On the other hand, the monitoring of the wired connection only, is not sufficient either. Full visibility to true service quality requires complete end-to-end monitoring capability. Prior art systems are not capable of detecting these kinds of network behavior and thus, this makes the network vulnerable to degraded service quality.

Furthermore in prior art, wireless intrusion detection prevention systems (WIDPS) have been developed. The WIDPS uses measurement stations which are able to measure traffic in the network in a passive manner, RF signal level and overall noise level. WIDPS measurements are focused on data security monitoring and their capability to monitor end-to-end service quality is very limited. WIDPS apparatuses are able to disconnect an intruder from the network by a specific disassociation command. The first shortcoming with the WIDPS is that due to modest RF and antenna technology, it requires a vast amount of monitoring stations in the network area in order to work properly. Another shortcoming in the WIDPS solution is that the monitoring station requires a wired connection to the LAN. A further problem in the prior WIDPS solutions is that they enable only passive measurements and provide no end-to-end service quality visibility or information about the bottlenecks in the network. Furthermore, WIDPS does not have support for mobility, like GPS positioning of the monitoring station.

One known solution in prior art is based on WLAN switches. Each switch control a number of base stations and the switch can change configuration of each base station or change parameters for each base station. Therefore, the switch can define a certain controlled base station or multiple base stations as monitoring stations. Such monitoring stations are able to perform data security monitoring as in the WIDPS technology. This functionality and shortcomings are comparable to WIDPS systems. Additional issues with the switch-based solution is that it works only with Wireless LAN systems, scales poorly to larger configurations and requires a dedicated connection between the switch and access/monitoring point. Due to high operative cost related to dedicating transmissions lines to each access/monitoring point, this makes it practically impossible to manage a spread out network with this solution. Additionally, the base stations and the switches need to be provided by the same manufacturer. The switches are gateways for all the traffic. A fault in the switch may take down the whole wireless network under it. This leads to the need of using constantly two parallel WLAN switches in business applications that require high reliability. This even further increases the amount of switches and the costs in the switch-based solutions. Finally, a disadvantage is that the switch-based solution is non-mobile and it is not suitable for measuring the quality of service in view of the end user.

Furthermore in prior art concerning local area networks, there are solutions where data is transferred between desired servers and desired end user computers. Different data transfer protocols may be used and the solutions are based on software installed on the servers and computers. This is a wired technology for monitoring data traffic and for the transfer of the monitoring results. The main problem in these solutions for LAN is the lack of support for any RF measurements or for any data security measurements through radio interface. Thus they do not support any mobility, any wireless technologies or centralized network management that are crucial for any wireless network.

In WiMAX and cellular networks, there exist systems which monitor the traffic through internal interfaces of the network. These interfaces are between the base station and the fixed network and thus, no radio signal interfaces are covered at all with such monitoring systems. These systems do not offer full end user experience monitoring, they lack support for mobility and location related measurements. In wireless networks, location information is necessary to report accurately network performance.

The main problem in prior art is that the end-to-end service quality for the large and spread out wireless broadband networks cannot be monitored in any efficient and reliable manner.

SUMMARY OF THE INVENTION

The present invention relates to a method for service quality monitoring in a wireless network, wherein the network comprises network elements which further comprise at least one monitoring means with a directional antenna. The method comprises the steps of monitoring transmissions with at least one monitoring means with a chosen antenna direction, and determining at least one service quality parameter using the monitored transmissions.

The present invention relates also to a system for service quality monitoring in a wireless network, wherein the network comprises network elements which further comprise at least one monitoring means with a directional antenna. The system further comprises at least one monitoring means configured to monitor transmissions with a chosen antenna direction, and a calculating means configured to determine at least one service quality parameter using the monitored transmissions.

In other embodiments of the invention, the system comprises means configured to perform different method steps as is disclosed in the appended dependent claims.

The present invention relates also to a computer program for service quality monitoring in a wireless network, wherein the network comprises network elements which further comprise at least one monitoring means with a directional antenna. The computer program is embodied on a computer readable medium and controls a data-processing device to perform monitoring transmissions with at least one monitoring means with a chosen antenna direction, and determining at least one service quality parameter using the monitored transmissions.

In one embodiment of the invention, the method further comprises choosing a test signal transmitter among the network elements, transmitting a test signal through a desired route in the network, monitoring the test signal or a received response signal in a chosen receiver among the network elements, and calculating at least one service quality parameter from the test signal or from the received response signal.

In one embodiment of the invention, the service quality parameters comprise at least one of availability of the radio connection, availability of the service or application, accessability to a server or service, retainability of connection or service, capacity usage, number of users connected in the cell, quality of the radio connection, quality of service and security of service.

In one embodiment of the invention, the method further comprises monitoring at least one of an end user application service availability or quality, user actions and errors in networks usage, functionality of network access control or usage charging and RF transmissions from selected locations.

In one embodiment of the invention, the method further comprises transferring the monitoring results to an internal or external server of a network owner.

In one embodiment of the invention, the method further comprises controlling at least one monitoring means by the external server or by the internal server, by setting desired measurements.

In one embodiment of the invention, the results of monitoring, comprising network status and service quality, are retrieved from the monitoring means or displayed on a map, on a floorplan or on a screen.

In one embodiment of the invention, the method further comprises triggering an alarm, when the results of monitoring exceed predetermined ranges or vary from historical trend, or when the measured output power of the base station has a decreasing trend or exceeds regulations.

In one embodiment of the invention, a desired route comprises at least one radio connection of the wireless local area network.

In one embodiment of the invention, the method further comprises selecting or setting the direction of the antenna beam in horizontal, vertical or both directions before the monitoring.

In one embodiment of the invention, the method further comprises causing at least one cell change by the monitoring means during a monitoring period by selecting another antenna beam for use or redirecting the used antenna beam.

In one embodiment of the invention, the method further comprises monitoring a cell change success rate, duration and impact to end user service quality.

In one embodiment of the invention, the monitoring means has a local area network connection or at least one wireless connection or both.

In one embodiment of the invention, the method further comprises monitoring used network devices and end user device types, and collecting compatibility information concerning different devices of the network.

In one embodiment of the invention, the method further comprises identifying network device models and manufacturers by their MAC address.

In one embodiment of the invention, the method further comprises defining a monitoring means as a starting point of a route and the same monitoring means as an ending point of the route, or defining a monitoring means as a starting point of a route and another monitoring means as an ending point of the route, or defining a monitoring means as a starting point of a route and a test server as an ending point of the route, or defining a test server as a starting point of a route and a monitoring means as an ending point of the route, or defining a monitoring means as a starting point of a route and a reporting server as an ending point of the route, or defining a reporting server as a starting point of a route and a monitoring means as an ending point of the route.

In one embodiment of the invention, one monitoring means is capable of accessing several separate networks, monitoring them and transmitting results separately for each monitored network.

In one embodiment of the invention, the method further comprises using at least one test server located in public internet or close to central application servers as test counterpart for monitoring means located inside several closed networks.

In one embodiment of the invention, the method further comprises adjusting at least one of the transmitted output power and received signal level of the monitoring means.

In one embodiment of the invention, the method further comprises setting data rate used in the monitoring lower than automatically selected data rate.

In one embodiment of the invention, the method further comprises monitoring usage of radio channels in the wireless network, monitoring channel selection overlap between adjacent radio cells, and sending an alarm to network management in case of risk for degraded performance.

In one embodiment of the invention, the method further comprises polling the monitoring means for ensuring the functionality of the monitoring means and its network connection.

In one embodiment of the invention, the method further comprises measuring round trip time or a delay between data transmission and acknowledgement message in the monitoring means for a test signal transmitted between the monitoring means and a network element, calculating a distance between the network element and the monitoring means from the round trip time or the delay between data transmission and acknowledgement message, and calculating a location of the network element based on an antenna beam angle of the monitoring means and the calculated distance.

In one embodiment of the invention, the method further comprises transmitting a test signal to an end user through at least two base stations, and determining optimality of the serving base station from a round trip time or from a measured delay between data transmission and acknowledgement message.

In one embodiment of the invention, the method further comprises measuring signal levels using at least two antenna beams of the monitoring means, and if a signal transmitted by the network element is detected with at least two antenna beams, calculating a location of the network element using beam amplification forms of the antenna, beam directions and the measured signal levels.

In one embodiment of the invention, the method further comprises locating the position of the monitoring means by a Global Positioning System functionality.

In one embodiment of the invention, the method further comprises using the monitoring means as a passive monitoring means or as an active monitoring means or as a base station serving as the traffic gateway or as a repeater station serving a desired sector or as a spare route between at least two networks implemented in at least two different technologies, and switching the functionality of the monitoring means dynamically.

In one embodiment of the invention, the method further comprises supplying power for the monitoring means through inductive connection of the electromagnetic field.

In one embodiment of the invention, the method further comprises identifying desired user device for monitoring from the radio interface, monitoring the identified user traffic in local area network, and measuring at least one of user service quality, data security or security threat level from the local area network.

In one embodiment of the invention, the monitoring data is transferred to an application used for network management.

In one embodiment of the invention, the monitoring means is either a dedicated monitoring station or implemented integrally to a base station.

In one embodiment of the invention, the method is implemented in at least one of WLAN, WiMAX, Flash-OFDM, GSM/EDGE and WCDMA technologies.

In one embodiment of the invention, key performance indicators for the network are calculated using at least one of measured radio network signal to noise ratios, probe response times, amount of retransmissions, amount of transmitted data frames or used data rates or codecs between clients and access points or between equal network nodes or between monitoring stations and other network nodes. The purpose of the present invention is to ensure continuous availability of the service, good service quality for different applications and to prevent data security threats on the radio interface.

One advantage for the present invention is that it enables the measurements of true service quality as it is experienced by the end user. This is possible with different applications without any notable disturbance in the functionalities of the network. Using directive multi-beam antennas increases the coverage of one monitoring station and minimizes the number of needed stations. Use of directive antennas with active testing limits the spreading of the RF power only to a small sector at a time. This is essential for minimizing impact to other wireless traffic in the network. The present invention enables the locationing of the interfering signal sources, the bottle necks of the networks which restrict the service quality and it enables the monitoring of the service level agreements in different areas of the network and also in end-to-end connection routes as experienced by end users.

One benefit of the invention for the business point of view is that the operational costs in the network are lowered. Less personnel are needed for operating and maintaining even a diverse network. The method monitors the network and is able to trigger alarms automatically around the clock seven days a week. This enables fast detection of any problems in the network. Associated performance trending capability enables the prediction of network problems already before they are experienced by the users. Predicted network maintenance needs may this way be performed at the least disturbing time. All this leads to higher uptime, more satisfied customers and clear monetary business benefits. Furthermore, the invention enables remote monitoring from e.g. the premises of an external operator. This enables outsourcing network operation to an external network operator that otherwise would have no visibility to company internal network. With no visibility, very rare operators are willing to take responsibility of the company internal wireless network. Additionally, when there is a continuous visibility to network capacity usage and performance, there is no need to initially overdimension the wireless network capacity. Full visibility to user experience enables further investments to network capacity increase when there is a clear need for it.

DETAILED DESCRIPTION OF THE EMBODIMENTS

Reference will now be made in detail to the embodiments of the present invention, examples of which are illustrated in the accompanying drawings.

The present invention presents a method and system for performing network performance monitoring in mobile communication networks achieving service quality data, for instance. The method can be implemented in several kinds of networks, such as for example in WLAN and WiMAX networks (networks supporting the IEEE 802.16 standard). Also Flash-OFDM technology and VoIP over WiFi technology are useful applications for the present invention. Nonetheless, use of the presented method is not restricted to these embodiments.

Figure 1:
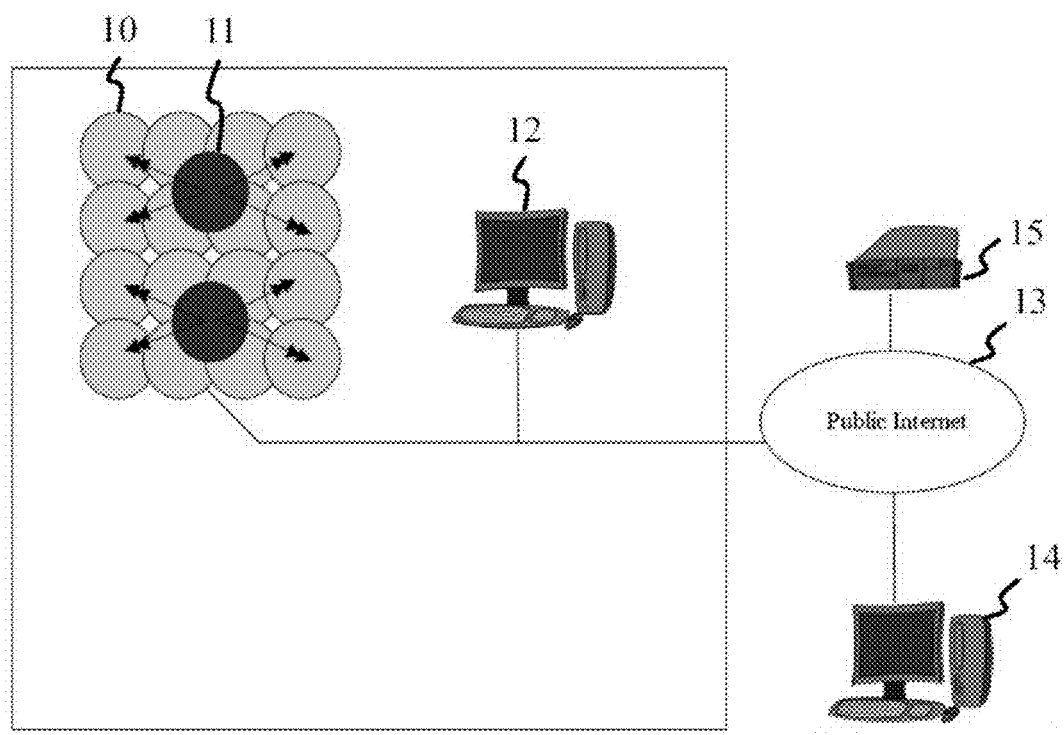
FIG. 1 illustrates elements of the system according to an embodiment of the invention.

FIG. 1 discloses an example of the system used in the present invention. The illustration shows the main components of the apparatus. Each sphere 10 includes a WiFi (WLAN) access point with the region covered by each of them. In this example, there are two monitoring stations 11 placed in the area. The arrows originating from the monitoring stations describe the test traffic transmitted by the monitoring stations. In addition to self-generated test traffic, monitoring stations monitor ongoing traffic in the network with the directive beam antennas with a capability to select desired beam for each operation. A reporting suite 12 collects the measurement results sent by the monitoring stations 11. The measurement results can also be transferred via public internet access 13 to a performance server 15 or to another reporting suite 14. The server 14 can be located in premises of a third party and in one example, the third party is a technical support service of the network service. The actual collection of the measurement data is performed by either reporting suite 12, 14. Reporting suites 12, 14 can command the monitoring stations 11 to perform predefined measurements. Furthermore, the collected measurement results can further be transmitted to the network administrator, inside or outside the company internal network.

The test signals concerning the measurements can be sent between the monitoring station 11 and the reporting suite 12 inside the network. It is also possible to set the performance server 15 as a counterpart against the monitoring stations 11 in active sets. The measurement software is loaded in the reporting suite 12. The reporting suite 12 inside the examined network can further report the measurement results to the external reporting suite 14 handled by a third party.

In an embodiment of the invention, a test signal is transmitted from a chosen network element, the test signal goes through a desired route via chosen network elements. After that the test signal is received and monitored passively in a chosen receiver among the network elements. At least one service quality parameter is calculated from the test signal.

In another embodiment of the invention, a test signal is transmitted from a chosen network element, the test signal goes through a desired route via chosen network elements. The test signal triggers a creation of a response signal in a chosen network element. The response signal can further be transferred through a determined route to a chosen receiver among the network elements. Thereafter, at least one service quality parameter is calculated from the received response signal.

The invention is based on the monitoring stations placed freely in the network area. The monitoring stations are mobile and independently functioning measurement units. The monitoring station is capable of measuring the signal, noise level and other RF properties as well as monitoring user traffic and creating test traffic. The monitoring station is also capable of controlling the beam of its antenna so that both horizontal and vertical rotation is possible.

Figure 2:
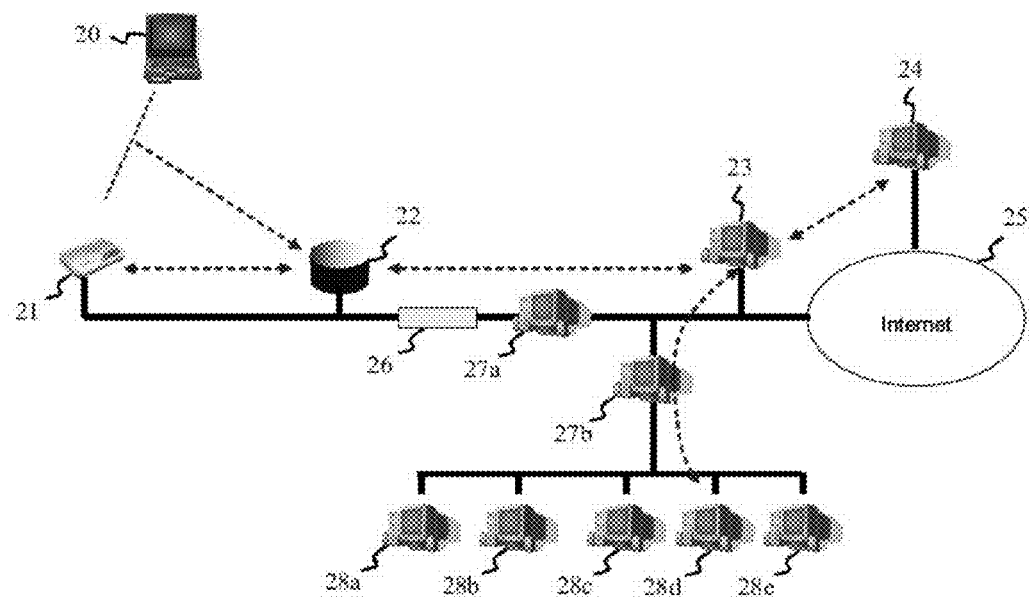
FIG. 2 illustrates different internal and external components of the network with possible test routes according to an embodiment of the invention.

FIG. 2 illustrates one embodiment of the network structure where the apparatus according to the present invention is implemented with the monitored network. The system includes an end user 20, a WLAN base station 21, a monitoring station EWM 22, a reporting suite 23, a performance server 24 and connectivity to internet 25. WLAN network includes furthermore a WLAN controller 26 and the system includes gateways 27a, 27b. Different devices are interconnected with an Ethernet connection. Furthermore, external companies may provide services through the servers 28a-28e located in their premises.

The system can measure functionalities of different services as they are experienced by the end user 20. The system can measure service quality in an end user application. Furthermore, the system can track link quality between two devices comprised in the network. These two devices can be chosen with the criterion that either the monitoring station 22 (EWM) or the reporting suite 23 is another end of a single end-to-end measurement. Few examples concerning the test routes of an end-to-end measurement comprise:

EWM 22—LAN/WAN—Reporting suite 23
Reporting suite 23—LAN/WAN—EWM 22
EWM 22—LAN/WAN—Performance server 24
EWM 22—LAN/WAN—corporate server 28
EWM 22—wireless connection—WLAN base station 21—LAN/WAN—Reporting suite 23
EWM 22—wireless connection—WLAN base station 21—LAN/WAN—Performance server 24
EWM 22—wireless connection—WLAN base station 21—LAN/WAN—corporate server 28
Reporting suite 23—LAN/WAN—WLAN base station 21—end user 20
Reporting suite 23—LAN/WAN—EWM 22—wireless connection—EWM 22—LAN/WAN—Reporting suite 23

The system may perform active tests to the chosen signal route. Several tests may be performed consecutively. When such results are compared with each other or to a chosen reference, a possible problematic element of the network can be revealed. The monitoring station 22 includes two Ethernet ports which enable the monitoring station to be connected between two network elements.

Furthermore, desired measurements can be set by an internal or external server which give such control data to the monitoring stations.

Furthermore, the measured data may be retrieved by the user directly from the monitoring station.

Figure 3:
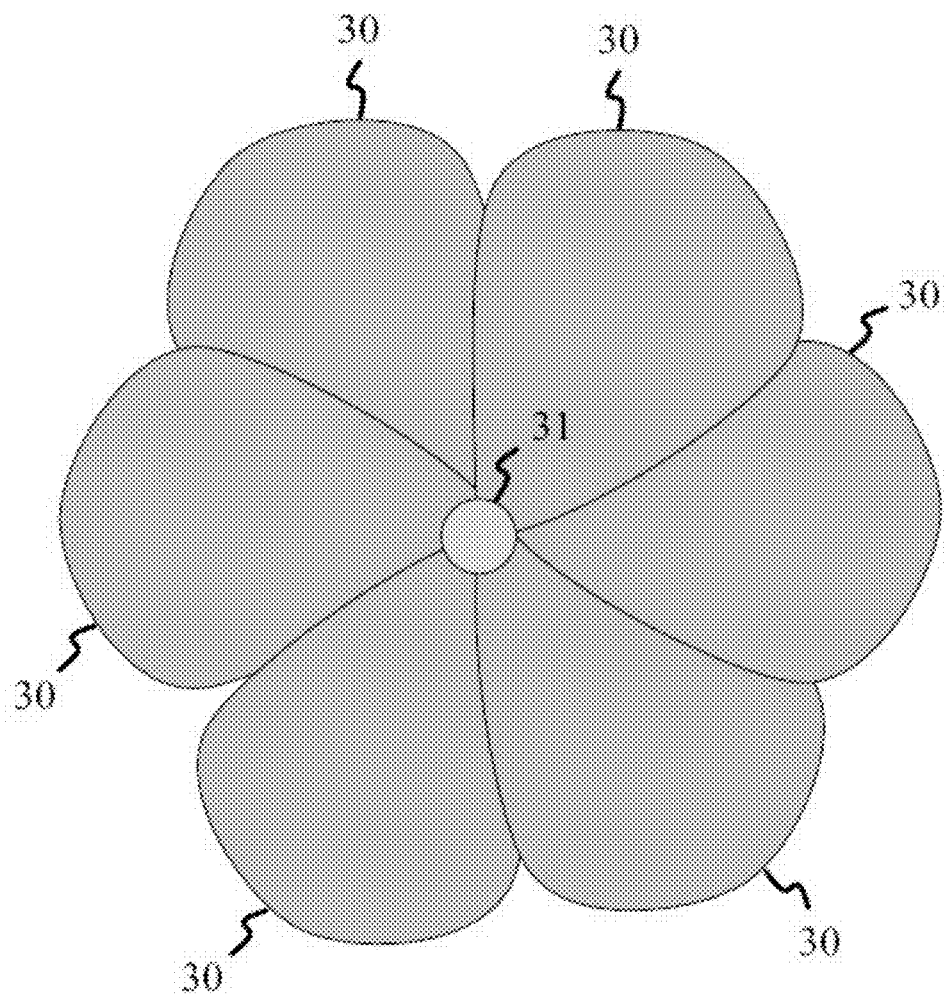
FIG. 3 illustrates beam selection of a directional antenna in one embodiment of the monitoring station.

FIG. 3 illustrates the functionalities of the antenna attached to the monitoring station. The antenna is capable of forming a directional beam towards the desired direction as a response to a control signal received from the measurement application of the monitoring station. The control of the antenna beam selection can also be provided externally, that is, e.g. by the reporting suite or by the performance server. Thus, the monitoring station 31 chooses the beam 30 among the group of all possible beam directions. FIG. 3 shows the beam formations with the point of view above the monitoring station so that the beam forms are horizontally directed.

The monitoring station may comprise at least one antenna element where each antenna element is capable for creating a directional antenna beam which in an advantageous solution is relatively narrow in its width. There could also be only one antenna or antenna group which is capable of changing the direction of the antenna beam. The antenna beam can direct in any direction and thus the direction may include horizontal and/or vertical components. This gives a possibility to cover the whole three-dimensional space in the surrounding environment of the monitoring station. The selection of the beam among the group of antenna beams or more generally, controlling the direction of the antenna beam currently in use, is performed by the monitoring station.

The monitoring station may be controlled by a microprocessor. The received signal is processed by a radio module and the processing is controlled by the microprocessor and suitable computer software installed in the monitoring station. Thus, the directions and corresponding signal strengths are achieved. The processor controls the reporting of the results to a performance server. This can be performed by the radio module wirelessly or via a fixed line connection. The performance server can in turn process the result data. The performance server can be in practice an internal server of the company or an external server which can be reached through e.g. public internet connection.

Furthermore, the monitoring station may comprise an integrated Global Positioning System (GPS) unit. The GPS unit keeps track of the exact location of the monitoring station when it is moved in the network area. The location data of the monitoring station is transmitted to the performance server together with the monitoring data.

The beam direction of the antenna may be tracked by an electric compass. The direction is tracked as an absolute value of the current antenna beam which is used in the measurements. The beam direction data may be sent to the performance server for further analysis.

The monitoring station may be provided with a battery in order to offer the power supply to the monitoring station without restricting the mobility of the monitoring station. In other embodiment of the invention, power for the monitoring station is supplied through inductive connection of the electromagnetic field.

In an embodiment of the present invention, the monitoring station can be implemented in a vehicle. Such a monitoring station can be freely placed in the network area if a need for service quality monitoring takes place in the network.

Figure 4:
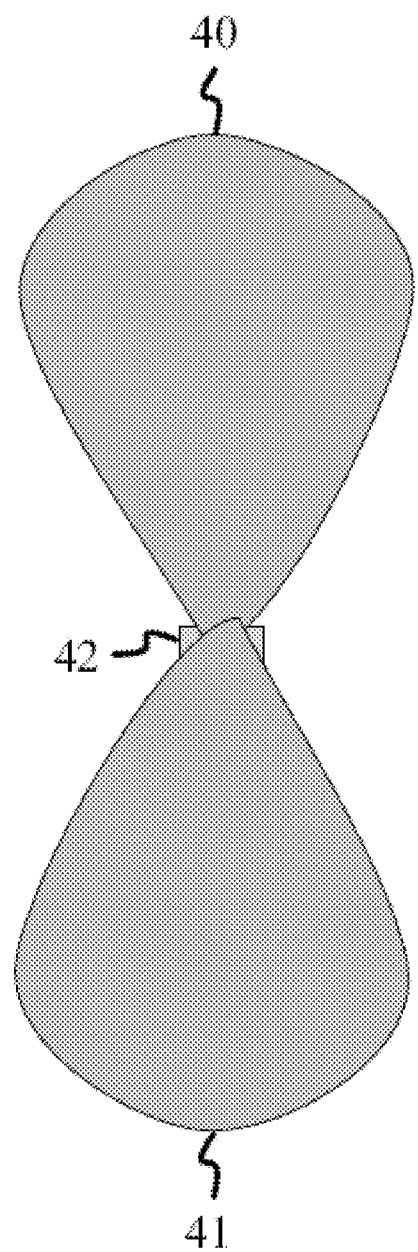
FIG. 4 illustrates beams in vertical direction in one embodiment of the monitoring station.

FIG. 4 illustrates other possibilities for directing the antenna beams of the monitoring station 42. The additional beams may be directed upwards 40 or downwards 41 from the monitoring station 42. One possibility is to direct the beam towards a slanting direction where the direction has both horizontal and vertical components. With such a solution, the present invention is able to cover the space in a complete manner around the monitoring station 42 and not just in a horizontal direction around the monitoring station. The vertical beams may be used together with the horizontal group of beams illustrated in FIG. 3.

Figure 5A:
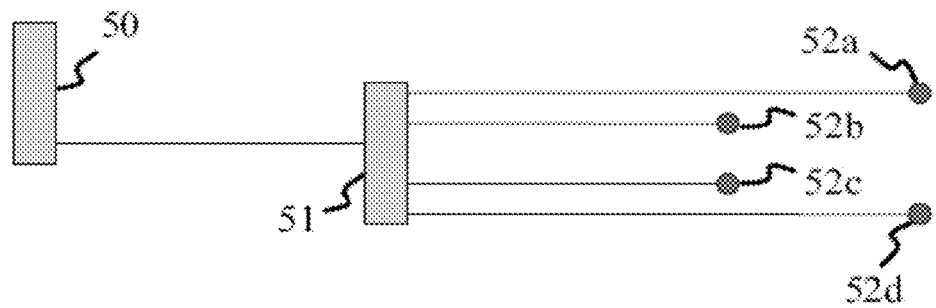
FIGS. 5a-c illustrate three configurations of wirings in a system comprising WLAN switches, base stations and monitoring stations.
Figure 5B:
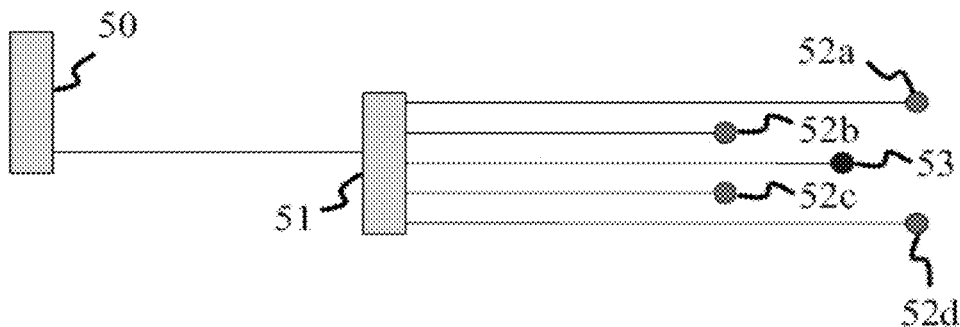
Figure 5C:
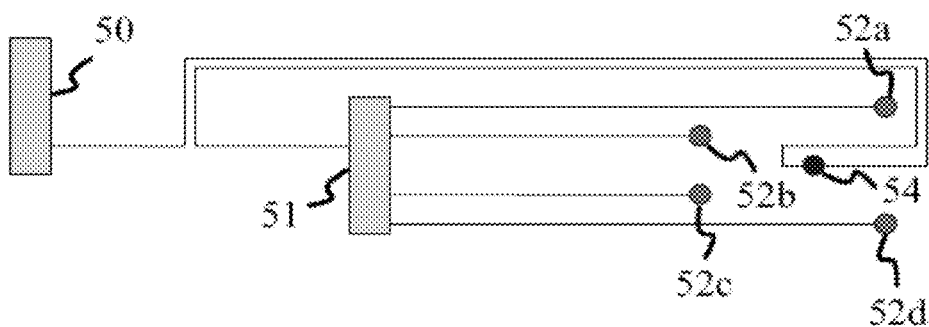

FIG. 5a illustrates the basic configuration of base stations and signal switches/routers in a WLAN network. FIGS. 5b-5c illustrate two embodiments of different configurations according to which the monitoring station can be connected in a WLAN network. The configurations in FIGS. 5b-5c represent the monitoring of a complete segment of the WLAN network. FIG. 5a shows an unmonitored configuration where WLAN base stations 52a-52d (four BS:s in this particular example) are each connected directly to the WLAN switch 51. The switch or router 51 is further connected to a second switch or router 50. If the monitoring is implemented to the configuration of FIG. 5a, it requires a closed interface between the switch and the base station. This leads to the situation where all the devices of the WLAN network need to be purchased from the same supplier.

The second configuration according to FIG. 5b shows a situation where a monitoring station 53 is added to the system. The monitoring station 53 is arranged among the base stations 52a-52d. The monitoring station 53 measures the traffic among the neighboring cells according to principles disclosed in previous FIGS. 1-4. Therefore, tests can be implemented through different base stations 52a-52d. The measurement results are reported to the network administrator through the reporting suite which includes a computer and associated software capable of collecting and transferring the measurement results.

The third configuration, which is shown in FIG. 5c, discloses a different kind of wiring for more efficient operation of the monitoring system. In this configuration the LAN connection between the two routers or switches 50, 51 is routed through the monitoring station 54. This gives a possibility to track all traffic transferred between the LAN and the base stations 52a-52d. The traffic can furthermore be monitored through the radio interface between the monitoring station 54 and the base stations 52a-52d. Finally, the testing through different routes is possible in a more diverse manner. With the configuration of FIG. 5c, it is easy to perform an end-to-end measurement against the monitoring station itself, that is, by transmitting the signal by the monitoring station 54 and receiving the signal in the same monitoring station 54 after the test signal has been propagated through desired base station(s) and router(s). Such a configuration enables proper managing of the LAN with its wireless connections. This configuration also gives freedom concerning the network construction because the switches and the base stations can be provided by different manufacturers. The wiring of FIG. 5c is not much more complex compared to FIG. 5b because only one additional pair of wiring is required.

Figure 6:
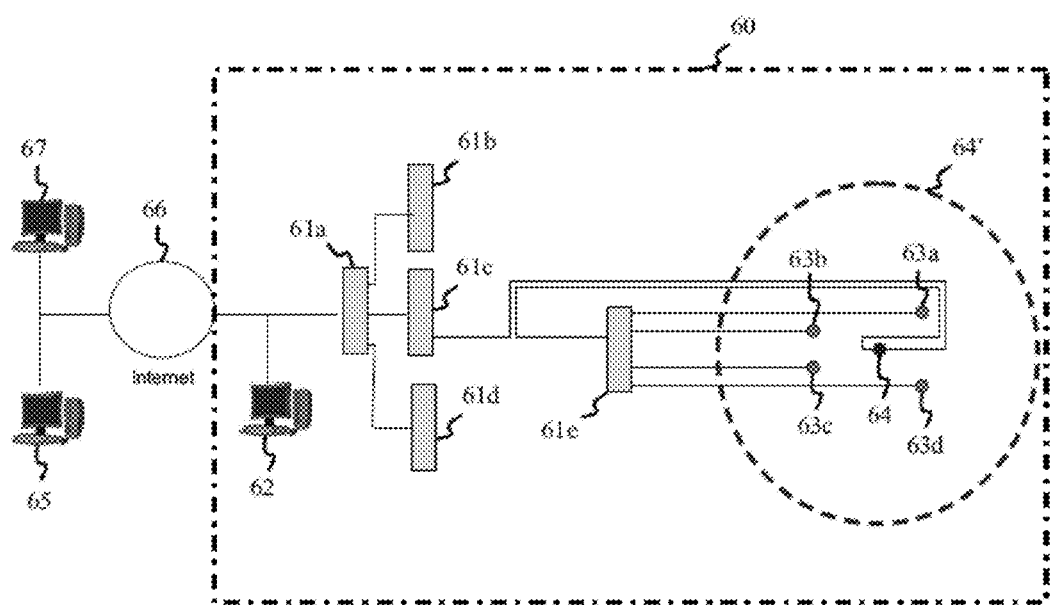
FIG. 6 illustrates an example of centralized management of several networks with integrated monitoring stations.

FIG. 6 illustrates a principle of centralized managing, operating and reporting for networks of several companies (or other multiple networks which are separate entities). The structure of a corporate WLAN network 60 follows mainly the description of FIG. 5c. Therefore, the WLAN comprises switches or routers 61a-61e, where the switch 61c is wired via the monitoring station 64 to the switch 61e. The WLAN monitoring station 64 has a surveillance area 64'. The reporting suite 62 manages the WLAN base stations 63a-63d and the monitoring station 64. The reporting suite 62 also comprises reporting software for collecting and transmitting the monitoring results outside the corporate network. The monitoring data is transferred through internet 66 to a centralized management server 67 which collects monitoring results from all networks programmed under the centralized monitoring system. Test server 65 is used as a counterpart in active tests where the monitoring station 64 transmits the test signals. In one embodiment of the invention, the system uses a test server as test counterpart and which is located in public internet, for monitoring stations located inside several closed networks. In one embodiment of the invention, one monitoring station is capable of accessing several separate networks, monitoring them and transmitting results separately for each monitored network.

The reporting suite 62 may change the configuration of the base stations and the monitoring stations which includes the operational settings, parameters, software releases and updates, for instance. In one embodiment of the invention, the data rate used in tests is set lower than automatically selected data rate. The base stations collect the throughput data of the prevailing traffic transmitted through transfer network interfaces and the radio interfaces, and report the collected data to the reporting suite 62. The quality of different signal routes is achieved by the monitoring stations with the test server as another end of the measurement signal route. Furthermore, the monitoring station covers radio connections in the area of 64' and the fixed line connections through the switches. Therefore, specified traffic signals can be monitored with the radio signal encryption and without the encryption. This reveals efficiently any intervention by a third party or any functional failure in a certain component of the WLAN network. With the centralized server 67 behind the internet connection, it is possible to create efficient database including multiple corporate WLANs with accurate availability and capacity data for each network.

Figure 7:
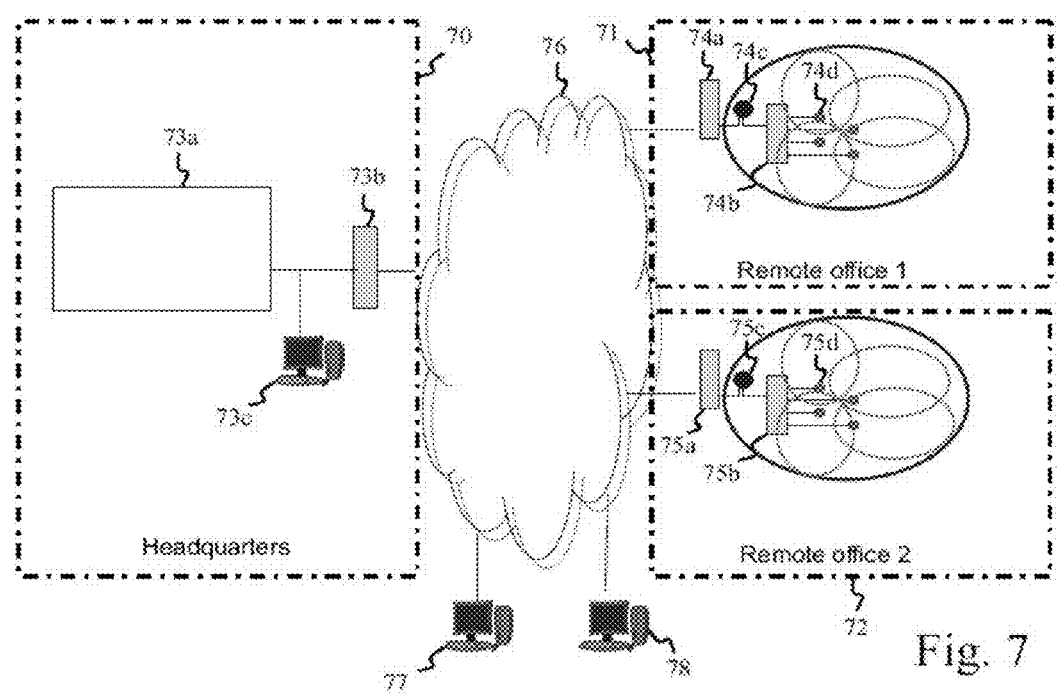
FIG. 7 illustrates an example of monitoring including a network of the headquarters and networks of the remote offices.

FIG. 7 illustrates an embodiment of the invention where different networks concerning different offices of a company are monitored and interconnected. The network of the headquarters is 70, the network of the first remote office is 71 and the network of the second remote office is 72. The networks are interconnected through public internet or transmission lines 76. The headquarters internal network 70 comprises LAN/WLAN network 73a which includes base stations and monitoring stations. The functionalities of these elements has been disclosed earlier. The connection to the internet 73b and a test server 73c for test management and reporting inside the headquarters network, are further provided.

The first remote office 71 has similar structure of the network as shown in FIG. 6. Thus, the first remote office network 71 comprises ADSL or other type of connection 74a to the headquarters network through Internet, at least one switch 74b, at least one monitoring station 74c and several WLAN base stations 74b. The ellipses depict the covered areas around each base station and the covered area of the monitoring station. The second remote office 72 comprises similarly ADSL or other type of connection 75a to the headquarters network through Internet, at least one switch 75b, at least one monitoring station 75c and several WLAN base stations 75b. The system includes a possibility to monitor the corporate networks externally by a network operator who has access to a server or computer 77. The system may include an external test server 78 for providing a test counterpart in active tests. The functionalities of 77 and 78 may also be provided in a form of single external server.

In the configuration of FIG. 7, external operator may have access to the monitoring results of a given network. This is performed so that rights are given to the operator for accessing the external test server 78 (the same as earlier disclosed performance server). The operator may give a special monitoring data request with the server 78. When the monitoring station (comprised e.g. in 73a) of a desired corporate network 70 performs subsequent tests with the counterpart server 78, the monitoring station 73a may transmit a test response of the request back to the external server 78. With such a procedure, the reporting suite 73c is able to transmit all required monitoring data safely to the operator's external server 78.

As a further embodiment of the invention, the end user is able to achieve useful information concerning the status of the WLAN connection. This is especially useful in locations where there are plenty of users crowding the network, thus pushing the ongoing traffic towards the capacity limits. The main problem is to find out whether the reason for malfunction is the equipment of the end user or some disturbance in the LAN system. The status reports to the end user may be implemented by an apparatus which is installed to desired premises or environment. Such an apparatus reports the network status to the user and the reporting may be implemented in various ways. The apparatus according to one embodiment of the present invention comprises a processor together with a memory unit, radio or LAN connection to the monitoring system of the network and a displaying means. The displaying means can be LEDs or other indicators, a display or an interface to an external display. The status reporting system informs different kinds of network users or administrators the current status of the network and such information can be provided with almost a realtime fashion to the user. In its simplest form, the status information can be provided as a green or red LED informing the user whether the network is available or not in the location at hand. The presented information may be for instance the names of cells which are available or unavailable, the signal strengths, occupancy levels, service quality levels (the quantity may vary) and the used network standard (like e.g. IEEE standard 802.11). The monitoring results may be represented to the end user or to an administrator on a map or on a floorplan of the building. In one embodiment of the invention, the status and service quality of network is displayed on a screen for network end users. Screens may be placed e.g. in public premises of the building so that the end users may see directly whether the WLAN connection is available. Such screens may be placed in entrances, lobbies and corridors of the building or other public places providing access to the WLAN. In another embodiment, network status and service quality is provided to network users over a wireless connection.

Another choice for informing the network status to end users is to transmit the status information to the mobile phones of the users via alternative radio network e.g a Bluetooth connection. A suitable software application may be additionally included in the apparatus for illustrative presentation of the status information.

The displaying means or the status informing means disclosed earlier may be placed integrally with the monitoring station. One alternative is to use a dedicated application in the user terminal which provides the status information. This natually requires a working connection to the WLAN or other network connection. Furthermore, the location data of the user can be provided with the network status data, thus completing the status information. The end user can access the network status and connection quality data by logging to an application in the reporting suite or in the monitoring station comprising the desired data. Alternatively, the end user may have an application installed in the user terminal which is integrated with the system regarding the updates of the monitored status data. Such data transfer to the user application may be performed automatically.

One embodiment of the status information procedure is to present the network status in different locations of the premises where WLAN connection is available. The network status can be shown in television or other display and the information may be presented e.g. in the lobby of the building the person just has entered. The network availability and the service quality in different locations may thus be efficiently informed in different areas of the building. Furthermore, these displays may be used for informing users on significant maintenance work taking place in the WLAN system which might have an effect on the communication services.

In a further embodiment of the invention, it is possible to adjust transmitted output power and/or RX signal level of the monitoring station. In another embodiment, the monitoring station may be provided with diversity reception functionality. Furthermore, it is possible to trace the number of users connected to a cell. The number of users may be examined application-specifically. In case the capacity usage is close to the maximum limit provided by the system, an alarm can be triggered in order to reconfigure the network and thus, giving e.g. extra capacity for the users needing it.

More generally, the monitoring results are compared to predetermined ranges. When such limits are exceeded, alarms will be triggered. The alarms can be shown to the end user or network administrator. Alarm signals can further be transmitted to other servers, either internal or external, which are used by appropriate user or administrator or operator of the network.

In other words, output power of the base stations can be measured with the monitoring station and an alarm can be set up in case of decreasing trend of the measured power.

In another embodiment of the invention, output power of the base stations is measured with the monitoring station and an alarm is set up in case of RF power levels which exceed regulations.

In a further embodiment of the invention, the usage of radio channels is monitored in the wireless network. Thereafter, channel selection overlap is monitored between adjacent radio cells, and a notification is sent to network maintenance in case of risk for degraded performance.

In a further embodiment of the invention, the monitoring station is polled for ensuring the functionality of the network connection for delivering alarms and measurement data.

In a further embodiment of the invention, the monitoring station can serve dynamically as a passive monitoring element, as an active testing device and as a base station serving the traffic. For example, the monitoring station can monitor the traffic actively or passively when the capacity usage is low. In case of increasing traffic, the monitoring station may restrict the given capacity to a lower level in order to provide a certain capacity for the monitoring functionality all the time.

In a further embodiment of the invention, the monitoring station can create a data transfer link to another monitoring station so that an additional signal path is formed to the WLAN network using a single technology. This is especially useful in a situation where the end user is not having an access to the LAN but the monitoring station is in connection with the end user. In such a situation, the link between two monitoring stations can form a spare route to the LAN for the end user, and the monitoring station is used as a repeater unit in the network. An additional advantage is that the directional antennas of the monitoring stations together with good RF characteristics may provide a long connection distance between the monitoring stations.

Furthermore, the monitoring station may include several parallel RF modules for interconnecting between two different technologies. In such a case, the monitoring station can receive traffic through e.g. WLAN technology and forward the traffic to another network using a different technology, e.g. WiMAX or 3G.

In one embodiment of the invention, a round trip time or data transmission/acknowledgement sequence delay is measured in the monitoring station for the test signal transmitted between the monitoring station and a network element. After that the distance between the network element and the monitoring station is calculated from the round trip time or data transmission/acknowledgement sequence delay. Finally, the location of the network element is calculated based on the angle of the antenna beam of the monitoring station and said distance.

In a further embodiment of the invention, signal levels are measured with at least two antenna beams of the monitoring means, and if the signal transmitted by the network element is detected with both antenna beams, the location of the network element is calculated using the beam amplification forms of the antenna and the measured signal levels. Such a locationing procedure may be used in cellular networks for determining an accurate position of the user terminals, base stations and other network elements including a radio interface.

In a further embodiment, a test signal is transmitted to the end user through at least two base stations. After that, the optimality of the serving base station is determined from the round trip time or the data transmission/acknowledgement sequence delay measurement.

Furthermore, the monitoring station may cause at least one cell change during a monitoring period by selecting another antenna beam for use.

Furthermore, the system according to the invention may be used in monitoring the performance metrics defined in the Service Level Agreement (SLA). Also the SLA may be negotiated between the user company and the company providing the services.

Furthermore, it is possible that field measurements are implemented through mobile computer used by maintenance personnel. The laptop computer may include suitable measurement software for active testing as is described earlier. The counterpart for the active tests may be a monitoring station. In a preferred solution, only connection through, radio interface is tested.

The implemented measurements for service quality monitoring may include a numerous amount of different quantities. Examples on such quantities comprise:

availability of the network connection concerning different networks, different base stations, different radio connections, services or applications
  accessibility to a desired server or service concerning internet and intranet services, and internal/external servers, base stations and networks
  retainability of the connection or service (normal termination of the service providing), handling failed WWW content downloads, interrupted calls or connections, and success of handovers
  usage of network capacity comprising uplink and downlink data rates, number of end users connected to each cell, number of end users using different applications which are connected to each cell, and the monitoring of optimal cell picking among the group of cells
  radio link quality comprising signal level, noise level, signal-to-noise ratio, performing spectrum analysis and usage intensity of the spectrum among different channels
  the quality of service comprising FTP throughput for uplink and downlink, ping round trip time, HTTP page download time, upload/download time for email service, packet loss, packet jitter, packet delay, voice quality such as Mean Opinion Score MOS or Perceptual Evaluation of Speech Quality PESQ, video quality and the rate of handovers
  data security issues comprising monitoring of the network user settings, identifying the attackers and disconnecting the attackers from the network
  compatibility of different devices comprising the definition of device types and manufacturers for each user based on MAC address data, using the device data of the base station and the end user for deciding the compatibility between different devices, reporting the incompatibilities between different devices and reasons for failed communication
  remote problem management comprising problem tracking in connections between the network elements and the end user devices in connection establishment and during normal communication. Furthermore, the data transferred through radio link may be saved to a memory for later inspection. Also the traffic and the occurred problems can be analysed centrally from desired location concerning the whole network in order for efficient problem tracking and elimination
  cell change success rate, duration and impact to end user service quality.

In one embodiment of the invention, the system may collect data of used network devices and types of the end user devices. Furthermore, the models and manufacturers of network devices are identified by their MAC (Medium Access Control) address and compatibility information is thus collected and reported further.

In one embodiment of the invention, the user actions and errors in network usage are monitored. In another embodiment of the invention, monitored RF transmissions are transferred from selected locations to an internal or external server for analysis or troubleshooting. Furthermore, in one embodiment of the invention, functionality of network usage charging is monitored.

In one embodiment of the invention, desired user device is identified for monitoring from the radio interface. Thereafter, the identified user traffic is monitored in local area network. Finally, end user service quality, security or security threat level is measured from the local area network. With such monitoring of the users accessing the network, possible attackers or other unauthorized users may be tracked and disconnected from the network.

In one embodiment of the invention, the monitoring results are recorded to a memory, and the monitoring results are transferred to an internal or external server.

In one embodiment of the invention, the data collected by the method is transferred to an application used for network management.

In one embodiment of the invention, the method is implemented in one of WLAN, WiMAX, Flash-OFDM, GSM/EDGE and WCDMA technologies.

In an embodiment of the invention, all relevant method steps disclosed earlier comprising controlling of the devices, calculations and further processing of the data and signals, general settings, selecting and triggering of alarms, are performed by a computer program embodied on a computer readable medium which controls a data-processing device.

In one embodiment of the invention, network service quality parameters and key performance indicators may be calculated or normalized by using at least one of measured signal to noise ratios, probe response time, retransmission rates, amount of data frames or used data rates between the network client device and access point or between equal network nodes. For example, achieved service quality between the client and the access point may be calculated by passively monitoring traffic by using collected information on used codecs, amount of retransmissions between nodes and amount of transferred data frames. These metrics may be calculated to uplink and downlink directions separately.

In one embodiment of the invention, network service quality parameters or key performance indicators may be calculated or normalized by using measured signal-to-noise ratios, probe response times, retransmission rates, amount of data frames or used data rates between the monitoring station and the access point. For example, downlink throughput test result between the monitoring station and a network node may be normalized by using measured signal-to-noise ratio during the measurement. By normalizing the result this manner, its dependency to the distance between the monitoring station and the access point may be removed, and reliable and uniform metrics can be calculated using this test.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (e.g., voice, modem, and the like), wireless communications media, one or more wireless communications networks, cellular communications networks, 3 G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method for service quality monitoring in a wireless network, the network comprising network elements which further comprise at least one monitoring means with a directional antenna, the method comprising the steps of:

selecting or setting a direction of the antenna beam in a horizontal direction, in a vertical direction, or in both the horizontal direction and the vertical direction in order to establish a chosen antenna direction for monitoring purposes;

after said selecting or setting step, monitoring transmissions with at least one monitoring means with the chosen antenna direction, where the monitoring means are independently functioning measurement units;

determining at least one service quality parameter using the monitored transmissions; and using one of i) a test server and ii) another monitoring means as a test counterpart for the monitoring means, wherein, the monitoring means creates test traffic comprising test signals, and controls a beam of the antenna in a horizontal direction, in a vertical direction, or in both the horizontal and vertical directions, the test counterpart is at least one test server located in public internet or close to central application servers for monitoring means located inside several closed networks, and the test server being used in active tests determining end-to-end transmission quality between devices where the test server receives the test signals created by the monitoring means, performs tests using the test signals, and transmits results of the test from the received test signals, the active tests including testing end-to-end transmission quality between network and end-user devices in each direction therebetween.

2. The method according to claim 1, the method further comprising:

choosing a test signal transmitter among the network elements;

transmitting a test signal through a desired route in the network;

monitoring the test signal or a received response signal in a chosen receiver among the network elements; and calculating at least one service quality parameter from the test signal or from the received response signal.

3. The method according to claim 2, wherein the desired route comprises at least one radio connection of the wireless local area network.

4. The method according to claim 1, wherein the service quality parameters comprise at least one of availability of the radio connection, availability of the service or application, accessability to a server or service, retainability of connection or service, capacity usage, number of users connected in the cell, quality of the radio connection, quality of service and security of service.

5. The method according to claim 1, the method further comprising:

monitoring at least one of an end user application service availability or quality, user actions and errors in networks usage, functionality of network access control or usage charging and RF transmissions from selected locations.

6. The method according to claim 1, the method further comprising:

transferring the monitoring results to an internal or external server of a network owner.

7. The method according to claim 1, the method further comprising:

controlling at least one monitoring means by an external server or by an internal server, by setting desired measurements.

8. The method according to claim 1, wherein the results of monitoring, comprising network status and service quality, are retrieved from the monitoring means or displayed on a map, on a floorplan or on a screen.

9. The method according to claim 1, the method further comprising:
triggering an alarm, when the results of monitoring exceed predetermined ranges or vary from historical trend, or when the measured output power of the base station has a decreasing trend or exceeds regulations.

10. The method according to claim 1, the method further comprising:
causing at least one cell change by the monitoring means during a monitoring period by selecting another antenna beam for use or redirecting the used antenna beam.

11. The method according to claim 1, the method further comprising:
monitoring a cell change success rate, duration and impact to end user service quality.

12. The method according to claim 1, wherein the monitoring means has a local area network connection or at least one wireless connection or both.

13. The method according to claim 1, the method further comprising:
monitoring used network devices and end user device types; and
collecting compatibility information concerning different devices of the network.

14. The method according to claim 1, the method further comprising:
identifying network device models and manufacturers by their MAC address.

15. The method according to claim 1, the method further comprising:
defining a monitoring means as a starting point of a route and the same monitoring means as an ending point of the route, or
defining a monitoring means as a starting point of a route and another monitoring means as an ending point of the route, or
defining a monitoring means as a starting point of a route and a test server as an ending point of the route, or
defining a test server as a starting point of a route and a monitoring means as an ending point of the route, or
defining a monitoring means as a starting point of a route and a reporting server as an ending point of the route, or
defining a reporting server as a starting point of a route and a monitoring means as an ending point of the route.

16. The method according to claim 1, wherein one monitoring means is capable of accessing several separate networks, monitoring them and transmitting results separately for each monitored network.

17. The method according to claim 1, the method further comprising:
adjusting at least one of the transmitted output power and received signal level of the monitoring means.

18. The method according to claim 1, the method further comprising:
setting data rate used in the monitoring lower than automatically selected data rate.

19. The method according to claim 1, the method further comprising:
monitoring usage of radio channels in the wireless network;
monitoring channel selection overlap between adjacent radio cells; and
sending an alarm to network management in case of risk for degraded performance.

20. The method according to claim 1, the method further comprising:
polling the monitoring means for ensuring the functionality of the monitoring means and its network connection.

21. The method according to claim 1, the method further comprising:
measuring round trip time or a delay between data transmission and acknowledgement message in the monitoring means for a test signal transmitted between the monitoring means and a network element;
calculating a distance between the network element and the monitoring means from the round trip time or the delay between data transmission and acknowledgement message; and
calculating a location of the network element based on an antenna beam angle of the monitoring means and the calculated distance.

22. The method according to claim 1, the method further comprising:
transmitting a test signal to an end user through at least two base stations; and
determining optimality of the serving base station from a round trip time or from a measured delay between data transmission and acknowledgement message.

23. The method according to claim 1, the method further comprising:
measuring signal levels using at least two antenna beams of the monitoring means; and if a signal transmitted by the network element is detected with at least two antenna beams,
calculating a location of the network element using beam amplification forms of the antenna, beam directions and the measured signal levels.

24. The method according to claim 1, the method further comprising:
locating the position of the monitoring means by a Global Positioning System functionality.

25. The method according to claim 1, the method further comprising:
using the monitoring means as a passive monitoring means or as an active monitoring means or as a base station serving as the traffic gateway or as a repeater station serving a desired sector or as a spare route between at least two networks implemented in at least two different technologies; and
switching the functionality of the monitoring means dynamically.

26. The method according to claim 1, the method further comprising:
supplying power for the monitoring means through inductive connection of the electromagnetic field.

27. The method according to claim 1, the method further comprising:
identifying desired user device for monitoring from the radio interface;
monitoring the identified user traffic in local area network; and
measuring at least one of user service quality, data security or security threat level from the local area network.

28. The method according to claim 1, wherein monitoring data is transferred to an application used for network management.

29. The method according to claim 1, wherein the monitoring means is either a dedicated monitoring station or implemented integrally to a base station.

30. The method according to claim 1, wherein the method is implemented in at least one of WLAN, WiMAX, Flash-OFDM, GSM/EDGE and WCDMA technologies.

31. The method according to claim 1, wherein key performance indicators for the network are calculated using at least one of measured radio network signal to noise ratios, probe response times, amount of retransmissions, amount of transmitted data frames or used data rates or codecs between clients and access points or between equal network nodes or between monitoring stations and other network nodes.

32. The method according to claim 1, wherein, the monitoring step uses the monitoring means to i) measure signal noise level, signal RF properties, and user traffic, ii) create test traffic comprising test signals, and iii) control a beam of the antenna with both horizontal and vertical rotation, and the another monitoring means is used as the test counterpart in making the at least one service quality parameter using the monitored transmissions as part of active tests determining end-to-end transmission quality between the monitoring means and the another monitoring means where the another monitoring means i) receives the test signals created by the monitoring means, ii) performs tests using the test signals, and iii) transmits results of the test from the received test signals, the active tests including testing end-to-end transmission quality between network and end-user devices in each direction therebetween, the another monitoring means not being a test server.

33. The method according to claim 32, wherein, the monitoring means is a non-mobile, device remaining in a fixed position while making plural end-to-end transmission quality determinations between the monitoring means and a plurality of said another monitoring means, including:

a)—selecting or setting a first direction of the antenna beam in the horizontal direction, in the vertical direction, or in both the horizontal direction and the vertical direction in order to establish a first chosen antenna direction for the monitoring purposes, the monitoring means monitoring transmissions with the first chosen antenna direction, and determining a first end-to-end service quality parameter using the monitored transmissions between the monitoring means and a first of the another monitoring means, and b)—selecting or setting a second direction of the antenna beam in the horizontal direction, in the vertical direction, or in both the horizontal direction and the vertical direction in order to establish a second chosen antenna direction for the monitoring purposes, the monitoring means monitoring transmissions with the second chosen antenna direction, and determining a second end-to-end service quality parameter using the monitored transmissions between the monitoring means and a second of the another monitoring means.

34. A non-transitory computer readable medium containing a computer program for service quality monitoring in a wireless network, the network comprising network elements which further comprise at least one monitoring means with a directional antenna, the computer program controlling a data-processing device to perform:

establishing a chosen antenna direction for monitoring purposes by selecting or setting a direction of the antenna beam in a horizontal direction, in a vertical direction, or in both the horizontal direction and the vertical direction;

monitoring transmissions with monitoring means with the chosen antenna direction, where the monitoring means are performed by independently functioning measurement units, the monitoring means measuring signal noise level, signal RF properties, and user traffic, creating test traffic comprising test signals, and controlling a beam of the antenna with both horizontal and vertical rotation;

determining at least one service quality parameter using the monitored transmissions; and using one of i) a test server and ii) another monitoring means as a test counterpart for the monitoring means, the test counterpart being used in active tests determining two-way end-to-end transmission quality between devices where the test counterpart receives the test signals created by the monitoring means, performs tests using the test signals, and transmits results of the test from the received test signals.

* * * * *